United States Patent [19]

Ernstoff et al.

[11] 3,821,796

[45] June 28, 1974

[54] TELEVISION DISPLAY SYSTEM

[75] Inventors: Michael N. Ernstoff, Los Angeles; William C. Hoffman, Torrance; Eric R. Fehr, Los Angeles; Richard N. Winner, Palos Verdes Peninsula, all of Calif.

[73] Assignee: Hughes Aircraft Company, Culver City, Calif.

[22] Filed: Jan. 30, 1973

[21] Appl. No.: 327,896

Related U.S. Application Data

[63] Continuation-in-part of Ser. No. 115,553, Feb. 16, 1971, abandoned.

[52] U.S. Cl. .................... 358/65, 358/12, 358/17, 358/58

[51] Int. Cl. .................... H04n 9/12

[58] Field of Search .................... 178/DIG. 3, 6.8, 5.4 R, 178/5.2 R, 5.4 CF

[56] References Cited

UNITED STATES PATENTS

| | | | |
|---|---|---|---|
| 2,211,066 | 8/1940 | Maquire | 178/DIG. 3 |
| 2,393,890 | 1/1946 | Craig | 178/6.8 |
| 2,413,423 | 12/1946 | Wilson | 178/5.4 CF |
| 2,608,617 | 8/1952 | Affel et al. | 178/DIG. 3 |
| 3,461,231 | 8/1969 | Quinlan | 178/DIG. 3 |
| 3,600,510 | 6/1969 | Owen | 178/6.8 |
| 3,624,285 | 11/1971 | Wolff | 178/6.8 |

*Primary Examiner*—Richard Murray

*Attorney, Agent, or Firm*—W. H. MacAllister, Jr.; Walter J. Adam

[57] ABSTRACT

A low bandwidth high brightness display system that utilizes a multiple beam cathode ray tube to write a raster by concurrently scanning a plurality of lines with a selected number of beams. The system thus reduces the maximum data rate and writing speed relative to conventional arrangements with a resultant bandwidth reduction proportional to the number of beams. The concept is applicable to field sequential color television to produce simultaneously a high resolution, high brightness and high quality color display. For interlace, the multibeam tube grid may be switched so that, for example, during alternate fields of a frame, different sets of electron beams are applied to the tube face.

4 Claims, 17 Drawing Figures

PATENTED JUN 28 1974 3,821,796

SHEET 09 OF 10

TELEVISION DISPLAY SYSTEM

CROSS-REFERENCE TO RELATED APPLICATION

This application is a continuation-in-part of a copending U.S. Pat. applicaton Ser. No. 115,553 for IMPROVED TELEVISION DISPLAY SYSTEM filed Feb. 16, 1971 and now abandoned.

The invention herein described was made in the course of or under a contract or subcontract with the Navy.

BACKGROUND OF THE INVENTION

1. Field of the Invention

This invention relates to display systems and particularly to a television display system that operates with a relatively low bandwidth and a high brightness and which in one arrangement in accordance with the invention will provide a greatly improved field sequential type color television display.

2. Description of the Prior Art

Conventionally, television type displays have been unable to develop a high resolution, high brightness and high color quality display either by using a shadow mask technique or by using a field sequential color type arrangement. The use of a conventional dot sequential pattern system results in a relatively low resolution, low brightness and low color quality picture and a field sequential television system basically requires three times the video bandwidth for the same picture resolution.

Field sequential color television, as is well-known in the art, operates on the basis that the color picture is broken up into three pictures each representing one of the three primary color components, which are then transmitted sequentially to be recombined by the eye when viewed on the receiver. The receiver may consist of a monochrome television monitor with a set of three color filters sequentially passing in front of it, properly synchronized so that each picture component is displayed through its associated color filter. Because the picture components are presented at a sufficiently rapid rate, the images appear to the eye to fuse into a composite full-color image. Field sequential color television is basically incompatible with existing black and white systems because the three pictures have to be transmitted in the time formerly used by one, with resultant three times increased in signal bandwidth (if the same resolution is to be maintained).

Multi-beam cathode ray tubes are also well-known in the art and have been used for character generation with a high brightness level, in which computer generated synthetic video is used to turn the beams on and off in such a way that a message is written on the face of the cathode ray tube. However, multi-beam cathode ray tubes have not been applied to the bandwidth brightness and resolution problems of television type displays.

SUMMARY OF THE INVENTION

The system in accordance with the invention uses a multiple beam cathode ray tube to write a television type raster, or frame, with the maximum data rate and writing speed reduced by a factor equal to the number of simultaneously operating beams. The concept is further applicable to field sequential color displays or television to simultaneously achieve a high resolution, high brightness and high quality color display. The multiple beams sweep across the face of the cathode ray tube in paint brush fashion drawing two or more lines with each sweep. The rasters or frames are generated by moving the plurality of beam sweeps across the screen with time so that each successive sweep paints the area directly adjacent the previous trace. For interlacing, the tube beam forming grids or apertures may be switched during alternate fields so that different electron beams are applied to the screen during each field. The bandwidth of the system of the invention is reduced inversely with the number of beams utilized for painting the field or raster and the brightness of the display increases in proportion to the number of beams utilized to paint the sweep.

It is therefore an object of this invention to provide a high resolution and high brightness display.

It is a further object of this invention to provide a field sequential type color television display operating with a relatively low bandwidth.

It is another object of this invention to provide a color display system that operates with a number of separate narrow band video amplifiers to provide a relatively high signal-to-noise ratio.

It is another object of this invention to provide a high quality television display system utilizing an improved interlacing technique.

It is a still further object of this invention to provide an improved color television display system with substantially the same bandwidth requirements per channel as black and white television.

BRIEF DESCRIPTION OF THE DRAWINGS

These and other objects, features and advantages of the invention itself, will become apparent to those skilled in the art in the light of the following detailed description taken in consideration with accompanying drawings wherein like reference numerals indicate like corresponding parts throughout the several parts wherein.

DESCRIPTION OF THE PREFERRED EMBODIMENT

Figure 1:
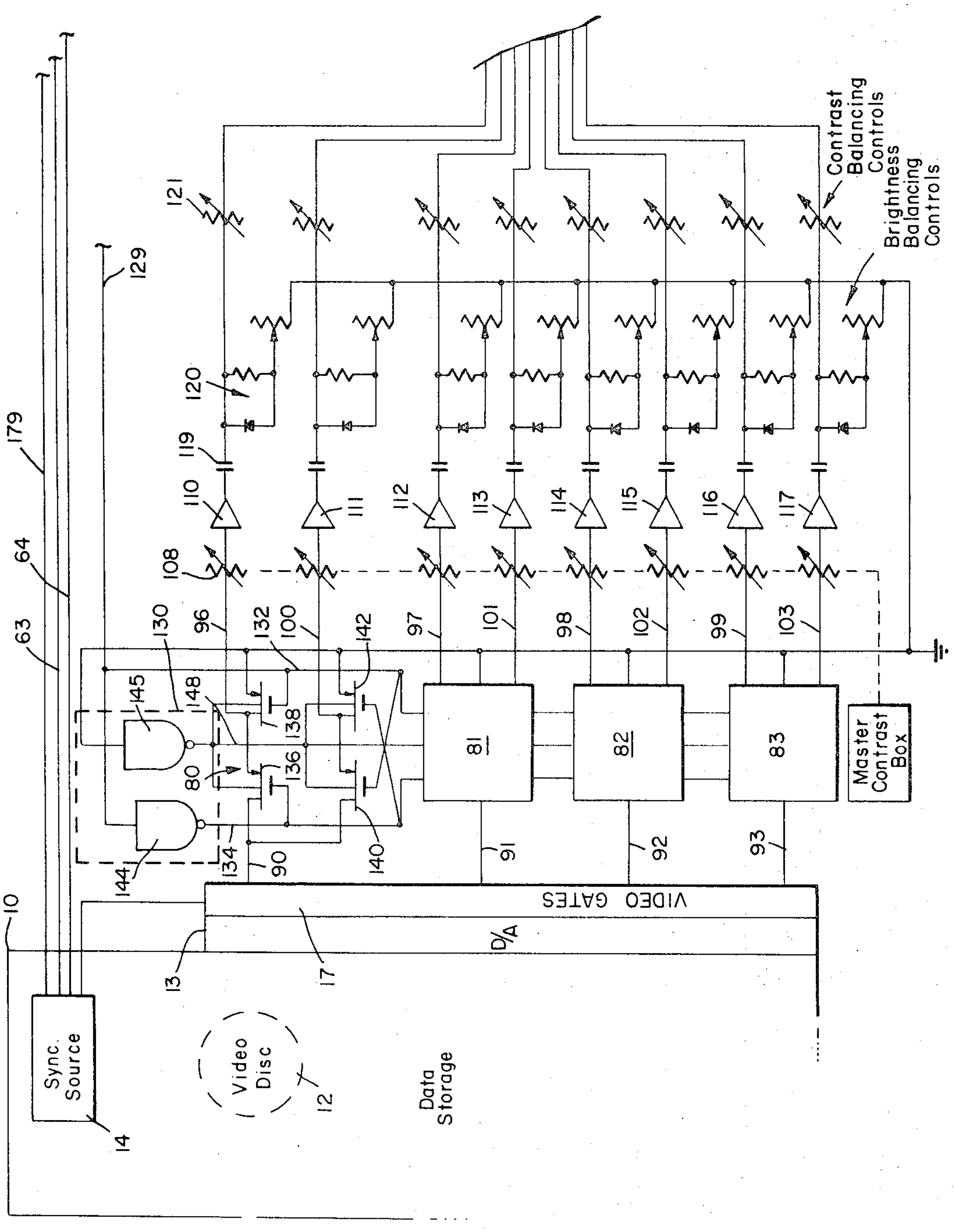
FIGS. 1 and 2 are schematic block and circuit diagrams showing the color display system in accordance with the principles of the invention.
Figure 2:
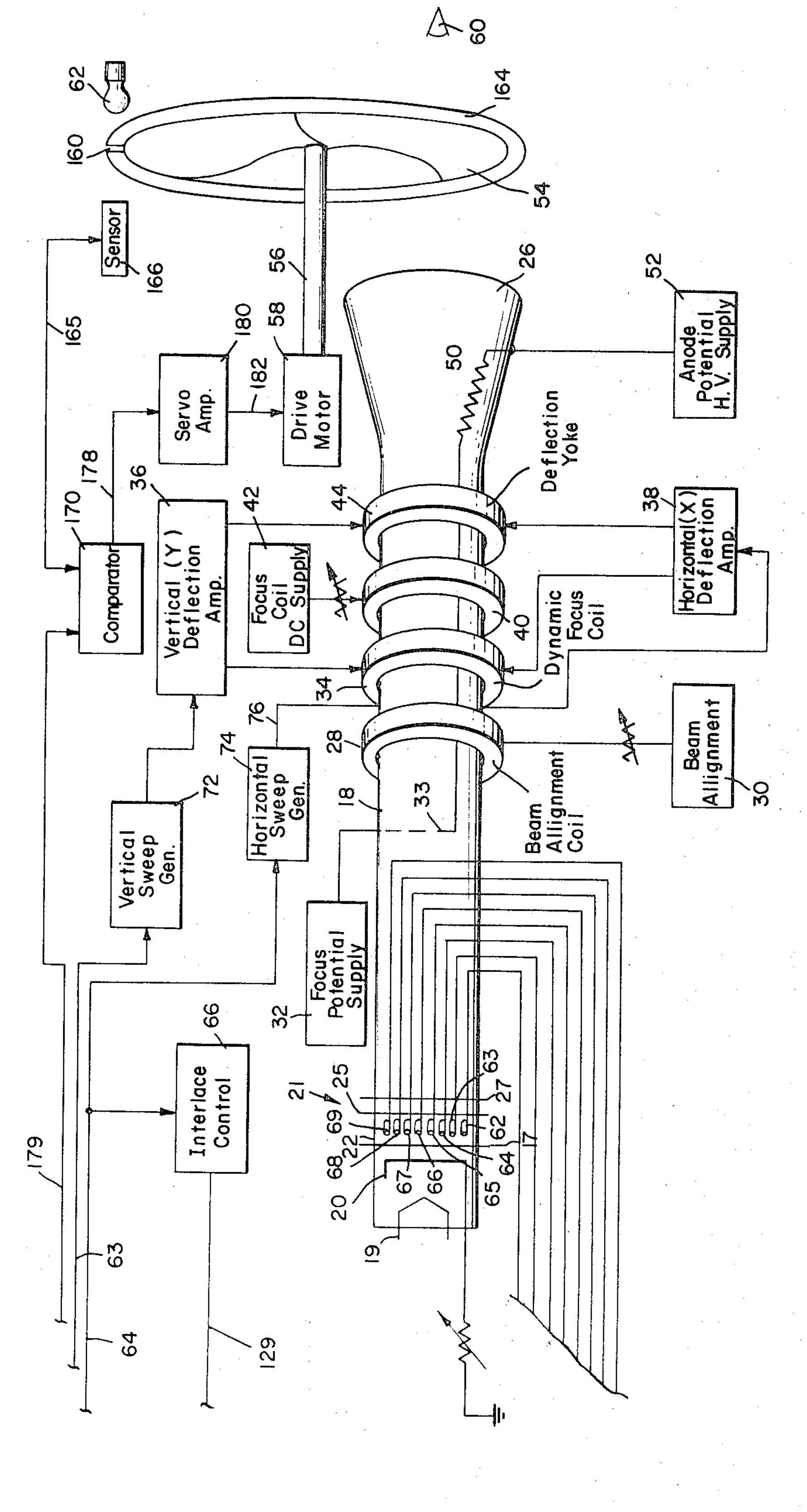

Referring now to FIGS. 1 and 2 which show the television display system in accordance with the invention, a data source 10 is provided having therein a suitable storage unit, which for example may be a video disc 12 or any suitable other arrangement such as a magnetic drum, a tape unit, a core memory or other type of memory arrangement suitable for either analog or digital storage. The data source 10 may also be a vidicon camera or plurality of operating tubes to obtain data from a chart or a scene. A suitable synchronizing unit or source 14 for timing control, may be provided in the data storage system 10. For digital storage on the video disc 12, a digital-to-analog (D/A) converter unit 15 is shown applying the analog data to video gates 17 controlled from the synchronizing source 15. A multi-beam cathode ray tube 18 is provided and may be of any suitable type, multi-beam tubes being well-known in the art. The number of beams provided by the tube may be as low as two or may be a substantially larger number such as in excess of 100, and presently in the art the limitations in the number of available beams appears to substantially be in the complexity of the individual wiring of the separate beam controls. The tube 18 includes an electron gun 21 formed by a heater grid 19, a cathode 20 of a suitably large area, a baffle 17 operated a few volts positive relative to the cathode and including an array of holes that correspond the required number of beams to be used on a phosphorous screen 26. The baffle is followed by a control grid or matrix grid 22 which is an insulated flat plate pierced with an array of apertures holes identical to those in the baffle, with the inner surface of the holes plated with a conductor. Two accelerating electrodes 25 and 27 may be provided after the matrix in the direction of beam travel. Other arrangements to form the beams at the beam forming matrix may be utilized in accordance with the system of the invention.

For the multi-beam display, the source of electron beams or gun 18 may thus be the flat cathode 20 with the parallel accelerating electrode or baffle 17 adjacent thereto. This electrode or baffle 17 which is near the cathode potential, may be a thin path having one aperture for each beam. The electrode 22 is the modulating electrode which contains the electrically isolated apertures and may be called the grid matrix. A conductor is provided to each grid aperture. The first and second anodes 25 and 27 each with apertures of a geometry similar to the baffle and grid matrix provides further acceleration of the beam. This type of a beam former may be thought of as providing images of extruding electrodes. Another type of multiple beam source or gun that may be utilized in the system of the invention operates so the apertures are only an opening surrounded by shielding for a source of electrons with each aperture having a control gate. This latter type forms beams as an image of the beam minimums (the minimum diameter of a beam when a beam originating from a multi-piece cathode merges). All of the multi-beam guns have a control electrode which may be a conductive sleeve in the aperture, and which may be gated off and on or effectively gated off and on. In the illustrated system, ground potential is applied from the switches to the beam control electrodes to bias them as an effective closed gate as the ground level is the black video level. It is to be noted that although in the illustrated system, interlacing is performed by switching the control electrodes, other arrangements such as modifying the sweep generation may be utilized in accordance with the invention.

Figure 3:
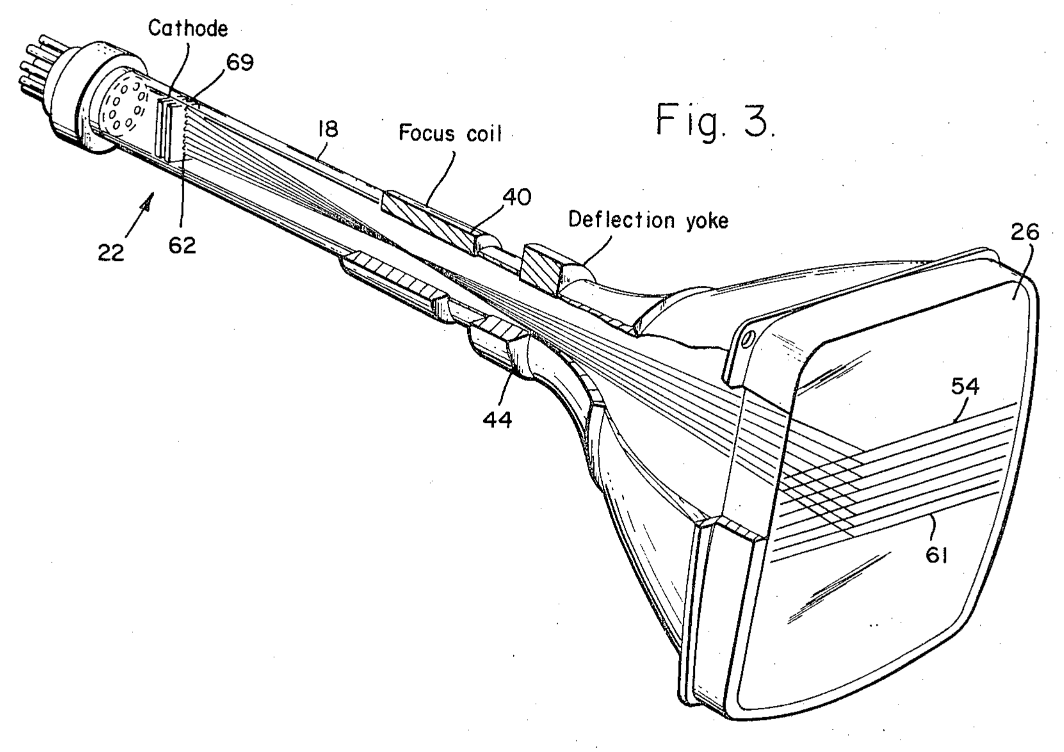
FIG. 3 is a schematic perspective drawing showing a typical multi-beam cathode ray tube that may be utilized in the system of FIG. 1.

The electrons from the gun 21 are then passed to a focus electrode 33 controlled by a focus potential supply 32 and to a beam alignment coil 28 controlled by a suitable beam alignment power supply 30. The beam alignment coil 28 is followed by a suitable dynamic focus coil 34 responding to signals from a vertical deflection or Y amplifier 36 and a horizontal or X deflection amplifier 38, to correct for the flatness in the configuration of the screen 26. The electron beams are then passed to a focus coil 40 controlled by a focus coil DC supply 42, which coil is followed by the deflection yoke or coil 44 having windings that respectively respond to X and Y deflection voltages of the horizontal deflection amplifier 38 and the vertical deflection amplifier 36. The cathode ray tube may also include a post deflection accelerator 50 in turn controlled by high voltage anode potential supply 52 referenced to the focus potential supply 32. As may be best seen in FIG. 3 electron beams in the form of a matrix from all the apertures may strike the tube face 26 at positions shown by the horizontal lines 54 through 60, each corresponding to electrons passed through respective apertures 62 through 69. It is to be noted that all electron beams in the tube of FIG. 3 may be utilized concurrently, but in the illustrated system of FIGS. 1 and 2 only four beams are utilized at one time.

Referring back to FIGS. 1 and 2, in front of the surface 26 is a sequential color wheel 54 operating on an axis 56, that responds to a drive motor 58. Suitable mounting structure (not shown) is provided. The sequential color wheel may be equally divided into three colors: red, green and blue or may be divided into a plurality of groups of these color combinations. As is well-known in the art when the wheel 54 rotates in sequence with the picture on the screen 56, an eye 60 sees all of the colors concurrently which are combined in the viewer's eye.

Suitable vertical and horizontal synchronizing signals are respectively applied through leads 63 and 64 to vertical and horizontal sweep generators 72 and 74. A field interlace control 66 receives the horizontal synchronizing signal on the lead 64 to control interlace switching between fields and may include a flip-flop of a conventional type to provide two levels of signal on a lead 129. The vertical sweep generator 72 applies a suitable slow Y sweep voltage through a lead 73 to the vertical deflection amplifier 36 for controlling the vertical deflection of the plurality of beams and the horizintal generator 74 applies a relatively fast X sweep voltage through a lead 76 to the horizontal deflection amplifier 38 for controlling the horizontal deflection of the beams.

For controlling the amplitude of the electron beams, analog data is provided from the video disc 12 and the D/A converter 13 for example, and applied through the video switch 17. The analog data is applied through leads 90 through 93 to respective switches 80 through 83. These four signals are then applied through the respective switches 80 through 83 to selected leads 96 through 99 or 100 through 103, one or the other groups being selected during each field or half of a frame time. The leads 96 through 99 are respectively coupled to the apertures 62, 64, 66, 68 and the leads 100 through 103 are respectively coupled to apertures 63, 65, 67 and 69. Each of the leads 96 through 103 includes a suitable master control circuit such as 108, a suitable respective video amplifier 110 through 117 respectively followed in turn by an AC coupling capacitor such as 119, a brightness balancing control for each lead such as the control 120 on the lead 96 and a contrast balancing control such as 121 on the lead 96. It is to be noted that each of the video amplifiers 110 through 117 in the multiple beam arrangement of the invention, requires a bandwidth of only one-fourth for the same picture resolution that is required for operation with a single beam.

A switch control 130 is responsive to the field interlace control 66 to alternately energize either a lead 132 or a lead 134 to connect the input lead such as 90 through a field effect transistor 136 to the lead 96 or to connect the lead 90 to a field effect transistor 140 to the lead 100. A logical true signal on the lead 129 from the interlace control 66 provides a low voltage on the base of the field effect transistor 136 to bias that transistor into conduction and connect the lead 90 to the lead 96 and provides a high voltage on the base of the field effect transistor 138 to bias that transistor out of conduction. In the illustrated arrangement the logical true and false signals on the lead 129 may be respectively +5.0 volts and 0 volts. At the same time the field effect transistors 140 and 142 are respectively biased out and into conduction. A logical false signal on the lead 129 provides a low signal on the base of the field effect transistor 140 to bias that transistor into conduction and provides a high signal on the base of the transistor 142 to bias that transistor out of conduction. The signal on the lead 90 is thus applied through the transistor 140 to the lead 100. An inverter 144 is thus provided between the lead 129 and the lead 134 to provide this conventional switching operation. An inverter 145 provided to decrease the effect of drift and aging applies a reference voltage to a lead 148 to control the substrate bias of the transistors.

To control the speed of the color wheel 54 an opaque rim 160 is provided at the position of the outer edge, passing light from a suitable lamp 62 through a slot 160 once each revolution, which slot is positioned at the red portion of the color filter. A sensor 166 which may be a photodiode responds to light passed through the slot 160 to pass a signal through a lead 165 to a comparator 170 to provide comparison with a red field synchronizing signal applied from the synchronizer source 14 through a lead 179. The comparator 170 develops an error signal $\epsilon$ on a lead 178 which is applied to a servo amplifier 180, in turn correcting the speed or angular rate of the drive motor 58 through a lead 182. The red field synchronizing signal on the lead 179 thus maintains synchronization of the rotating color wheel with the speed of scanning or formation of the raster on the surface 26.

Figure 4:
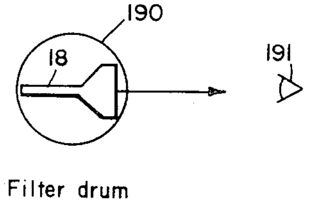
FIGS. 4 through 7 show alternate arrangements that may be utilized for providing the field sequential color presentation, either mechanically or electronically in accordance with the principles of the invention.
Figure 5:
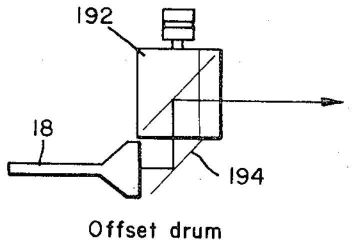
Figure 6:
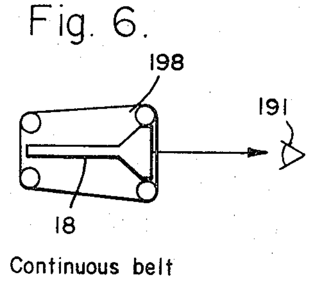
Figure 7:
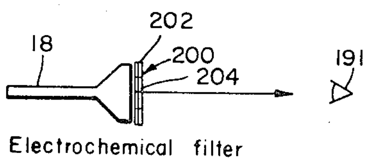

Referring now to FIGS. 4 through 7, other sequential techniques that may be utilized in accordance with the principles of the invention include positioning the tube 18 in a filter drum 190 in FIG. 4, the filter drum having suitable color filter areas positioned thereon and being rotated at proper synchronizing speeds for viewing out on the observer's eye 191. As shown in FIG. 5 a rotating offset drum 192 may be utilized with color filter areas on the drum surface and with suitable reflective surfaces 194 and 196, and as shown in FIG. 6, a continuously rotating belt 198 may be utilized having proper color filter areas positioned thereon. As shown in FIG. 7, an electrochemical filter 200 may be utilized and, for example, may be either a ceramic filter or a liquid cystal filter as is well-known in the art. The filter 200 may be separated into switchable sections such as 202 and 204 which are sequentially energized in sequence with the raster or frame formation. Ceramic filters are well-known in the art such as described in an article in Product Engineering, June 22, 1970, a McGraw Hill publication, page 36 entitled, "A Thin Slab of Ceramic and Display Color Images." Liquid crystal filters are also well-known in the art such as described in Electronics Magazine of July 6, 1970 on page 64 in an article entitled, "Now That the Heat is Off, Liquid Crystals Can Show Their Colors Everywhere," by Joseph A. Castelano.

Figure 8:
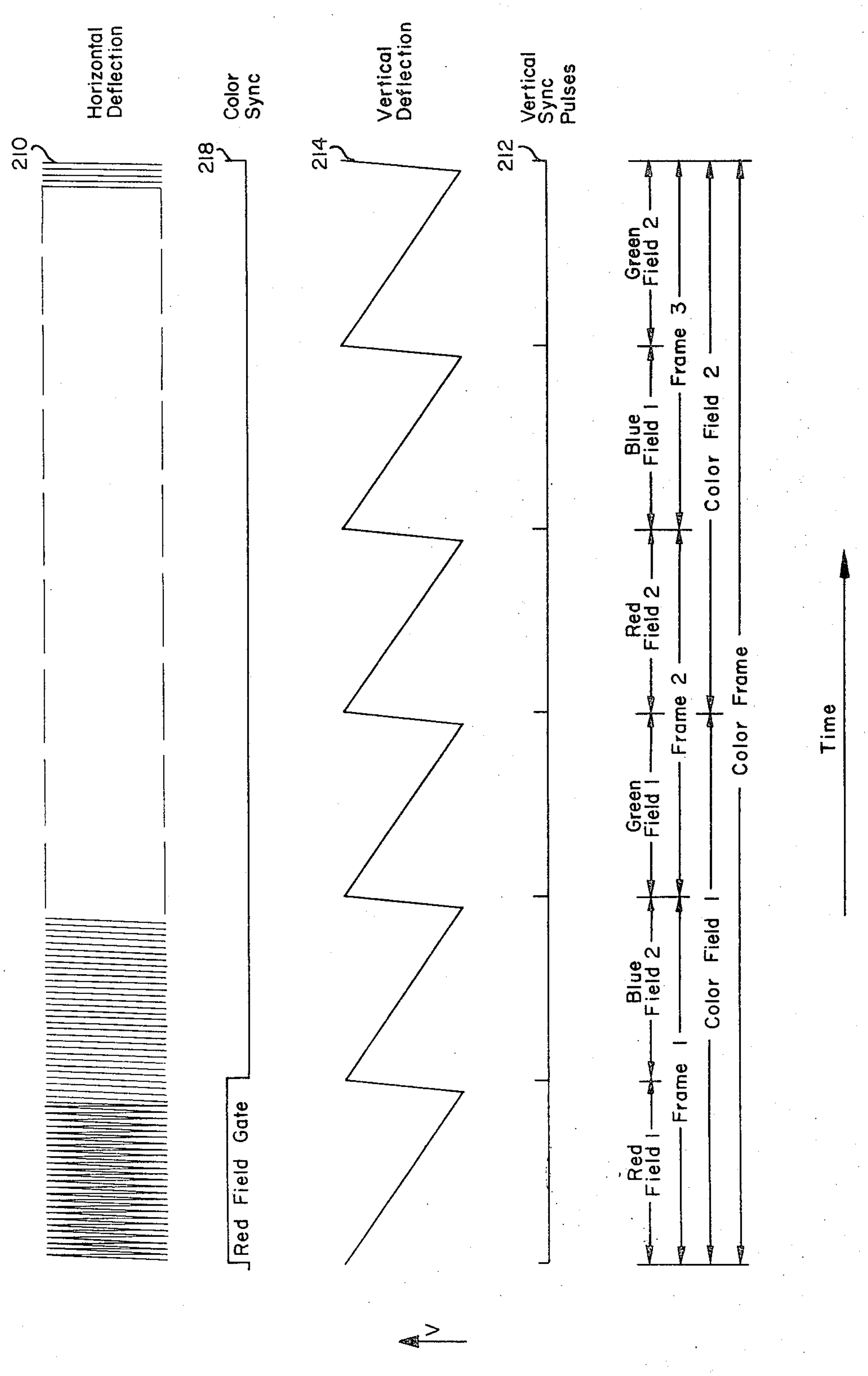
FIG. 8 is a schematic diagram of voltage waveforms as a function on time for explaining the operation of the system of FIGS. 1 and 2.

Referring now to FIG. 8, the basic timing for field sequential color television in accordance with the invention is shown for first describing the operation of multiple beam tubes with a normal scan format, that is a scanning sequence with two-to-one interlacing. A waveform 210 shows the horizontal deflection or X signal to provide a selected number of X lines between vertical synchronizing pulses of a waveform 212. The Y deflection voltage of a waveform 214 is synchronized with the synchronizing pulses of the waveform 212 and thus corresponds to the period for deriving a complete raster. For the interlaced raster, six fields are required to write the red, blue and green colors for a complete picture, three fields forming color field number 1 and three fields forming color field number 2, the two fields together forming a complete color frame. A red field gate signal of a waveform 218 and a sensed signal (not shown) on the lead 165 allows the comparator 170 to sense the relative time phasing or coincidence of the two synchronizing signals; thus providing an error correcting signal whose magnitude and sign is proportional to the phase error of the disc 54. The field switching pulse of a waveform 213 show the gating control interlace signal developed by the interlace control circuit 66 of FIG. 2.

Figure 9:
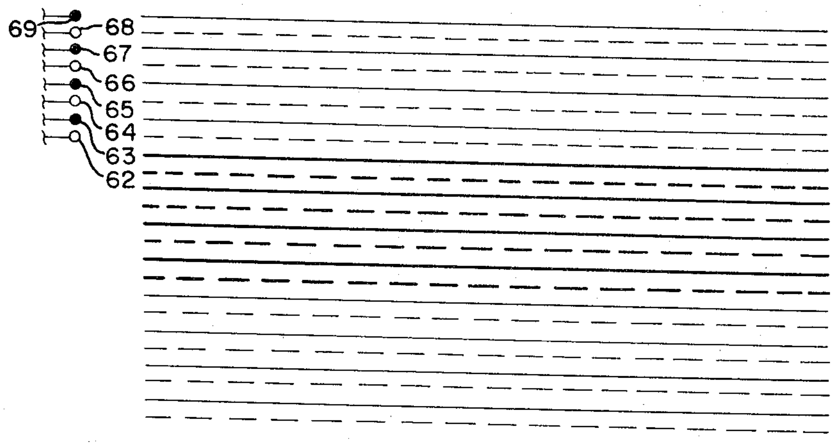
FIG. 9 is a schematic diagram showing the writing pattern on the face of the cathode ray tube with a two-to-one field to frame interlace and with eight beams utilized four at a time.
Figure 10:
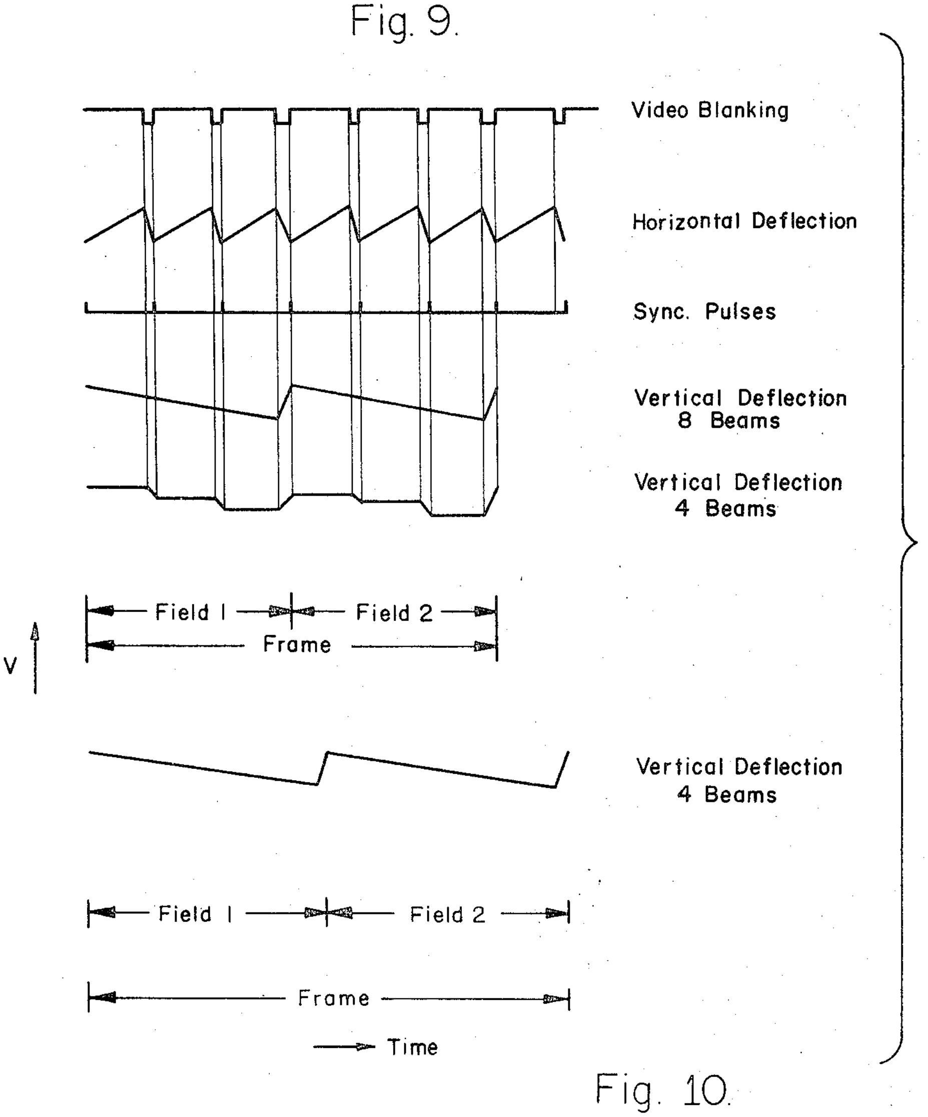
FIG. 10 is a schematic diagram of waveforms of time versus amplitude for further explaining the operation of the systems of the invention.

Referring now to FIG. 9, which shows a frame formed by eight beams utilized four at a time with full line interlace in accordance with the arrangements shown in FIGS. 1 and 2. A frame format is shown for a full line interlace system in which, for example, the interlace may be obtained by alternating the group of electron beams selected in the system of FIGS. 1 and 2. Eight beams are utilized with four beams being gated through the electrodes during each field period, with the solid lines indicating the scan of the four beams in the X direction for three sweeps or scans of a first field and the dotted lines indication the scan direction for three sweeps or scans of the next field. It is to be understood that the entire frame may include any desired number of lines in the X direction but for purposes of illustration only 24 lines resulting from six sweeps or scans are shown. The apertures 62 through 69 are shown corresponding to the apertures in the tube 18 of FIGS. 1 and 2. Referring now also to FIG. 10, the horizontal synchronizing pulses of a waveform 220 are applied on the lead 64 to the horizontal sweep generator 74 for triggering a sweep voltage. The generator 74 thus responds to the horizontal sync pulses to develop the sweep signals of a waveform 226. Also, suitable signals (not shown) are applied through lead 63 to the vertical sweep generator 72 to develop vertical deflection sweeps of a waveform 229. Suitable video blanking pulses are developed in the synchronizer 14 as indicated by a waveform 228 and are applied to the video gate 17. Thus for the full line interlace format, six horizontal sweeps define an entire frame formed from first and second fields. For a full line interlace the number of lines in the entire frame must be an even multiple of the beam number used during each painting or sweep of the lines. It should be noted that the minimum frame frequency for large area flicker free viewing is approximately 60 hz under high ambient lighting conditions.

Figure 11:
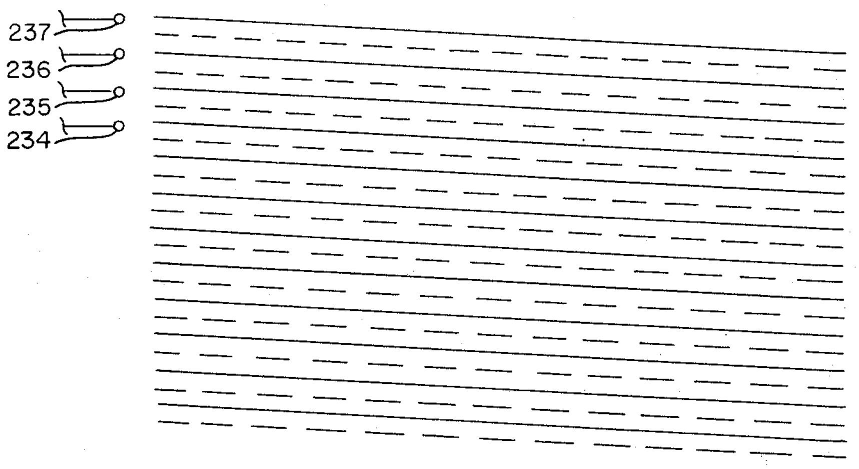
FIG. 11 is a schematic diagram showing the pattern on the cathode ray tube for a two-to-one field to frame, full line interlace utilizing four beams, four at a time.

Referring now to FIG. 11, a full line interlace frame is shown utilizing a four beam array which is swept across the screen four beams at a time. Thus in this arrangement during field 1 as controlled by the vertical deflection signal of a waveform 232 of FIG. 10, all the dark lines are painted during the first field and the beams are then deflected half of the line spacing, so that during the second field all of the dotted lines are painted. It is to be understood that the principles of the invention are not limited to any number of multiple beams or to any particular interlace scheme. Aperture electrodes 234 through 237 which show control leads connected thereto may be utilized with a multiple beam tube 18 of FIGS. 1 and 2 selected with only four apertures, by elimination of the beam switching utilized with the illustrated eight beam arrangement.

Figure 12:
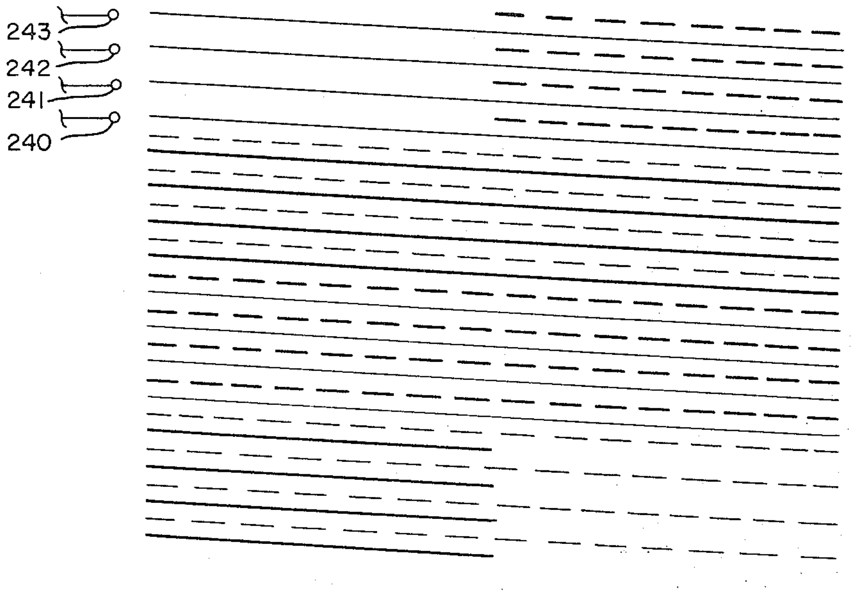
FIG. 12 is a schematic diagram showing the pattern on the cathode ray tube for a two-to-one field to frame, half-line interlace utilizing four beams, four at a time.

Referring now to FIG. 12, which shows half-line interlace utilizing four beams at a time provided by the aperture electrodes 240 to 243 of a four beam tube as may be utilized in the system of FIGS. 1 and 2 without the beam switching. For this arrangement the horizontal deflection signals of the waveform 226 (FIG. 10) may be utilized but the vertical deflection signal of a waveform 246 positions each alternate field such as field number 2 at a position half the spacing between the dark lines which in turn represents the positions of the sweeps during field number 1. The leads coupled to the electrodes 240 to 243 indicate that they may be utilized as the control matrix in a suitable cathode ray tube such as 18 of FIGS. 1 and 2. It is to be noted that the half-time interlace of FIG. 12 may be utilized with the eight electrode arrangement shown in FIGS. 1 and 2 by controlling the vertical sweep of the signal in a manner indicated by the waveform 246, and that these and other frame format variations are within the scope of the invention. With this half-line, two-to-one field interlace of FIG. 12 the number of lines in the entire frame must be an odd multiple of the number of beams or apertures utilized at one time. The horizontal oscillating frequency is equal to the number of lines divided by the number of beams times the frame frequency which for the illustrated arrangement of FIG. 12 is 28 divided by 4 all times 30.

Figure 13:
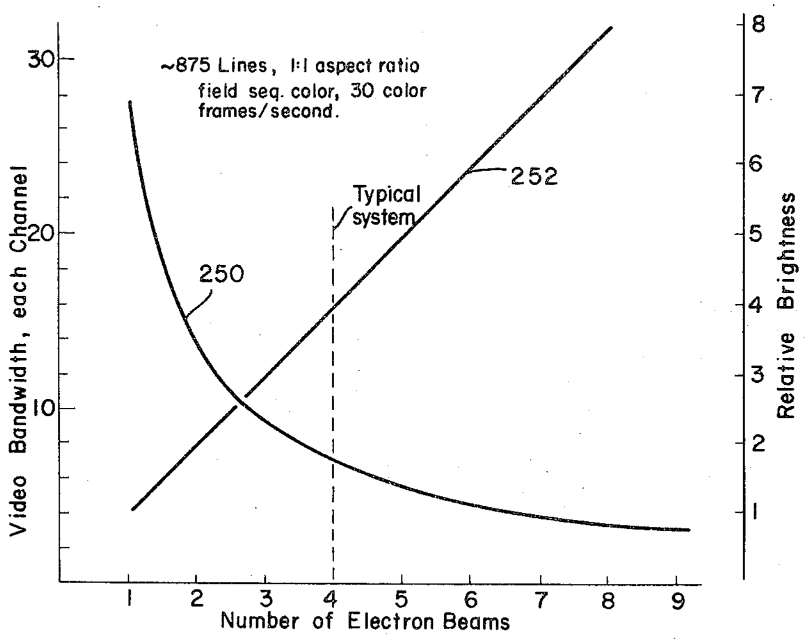
FIG. 13 is a schematic graph showing video bandwidth for each channel and relative brightness as a function of the number of electron beams to further explain the operation of the system of FIGS. 1 and 2.

Referring now A curve FIG. 13, the bandwidth brightness variation is indicated for a typical system, of approximately 875 lines, with a one-to-one aspect ratio and with field sequential color and with 30 color frames being developed per second. Acurve 250 shows that the video bandwidth for each channel, or each amplifier 110 to 117 decreases substantially with the increase of the number of electron beams, with four beams being indicated for a typical system. A line 252 shows that with the increase of the number of electron beams the relative brightness increases linearly and for the typical system of four electron beams is substantially higher than with a single beam system. Thus the bandwidth for each channel is reduced by a function of one over the number of beams utilized. The spot size that is necessary to meet a required resolution sets a limit on the maximum current per beam and hence the power density that is delivered to the cathode-ray-tube screen. For a given current per beam, the overall brightness is increased substantially by increasing the number of beams (while retaining the same spot size). The use of the field sequential type color television system without the limitations of shadow mask or a dot sequential technique provides a substantially greater brightness and the use of multiple beams in accordance with the invention further increases that picture brightness.

Figure 14:
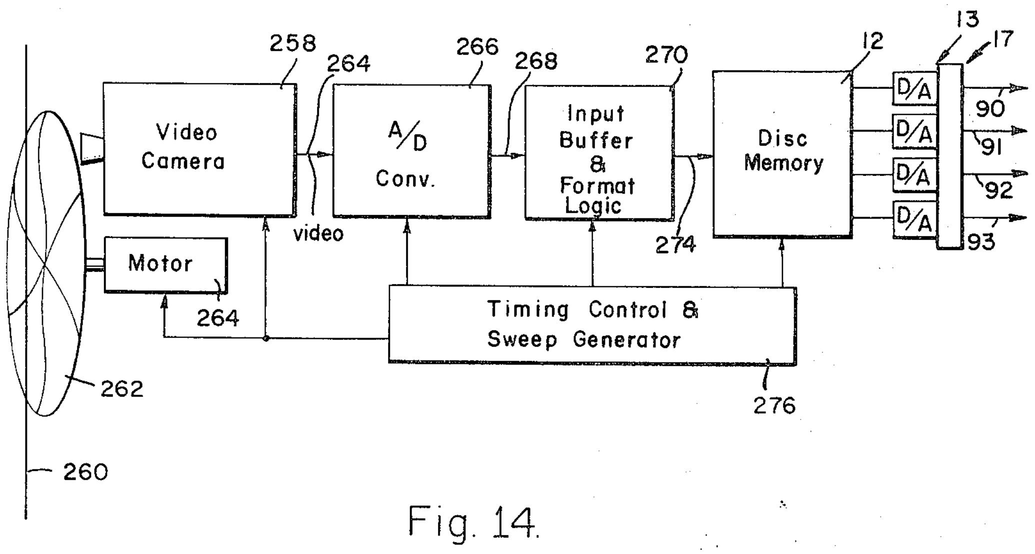
FIG. 14 is a schematic block and partially perspective diagram showing a typical arrangement that may be utilized to provide the stored data in the system of FIGS. 1 and 2.

Referring now to FIG. 14, a block diagram is shown to illustrate one scheme that may be utilized to provide the data for the multi-beam sequential display in accordance with the invention. In the illustrated arrangement a camera 258 may view a scene indicated by a line 260 which may be a chart or any desirable area. A filter 262 is provided in front of the camera rotated by a motor 264 with the filter having red, green and blue arc segments which for one arrangement may be repeated twice during a complete rotation thereof. The video signal developed by the camers 258 which may be any conventional type of camera, is applied through a suitable lead 264 to an A to D converter 266 and then in digital form through a composite lead 268 to an input buffer and format logic unit 270. The data sequencing provided by the circuit 270 depends upon the type of format used, that is, the number of beams and whether or not it is interlaced on the final picture. The buffer unit is properly timed to place the data in proper position so that when it is applied on a composite lead 274 to the disc memory 12, it is stored in the proper positions for being read out in parallel on the proper leads and in a correct sequence. A timing control and sweep generator unit 276 controls each of the units so that the data is properly stored in the memory 12. It is to be noted that this storage of the data is not necessarily in real time and very slow scan camera operation may be utilized. Upon completion of data storage in the disc memory 12 it may be passed through the digital-to-analog converter unit 13 and video switch 17 to the leads 90 through 93 to the display systems of FIGS. 1 and 2.

Figure 15A:
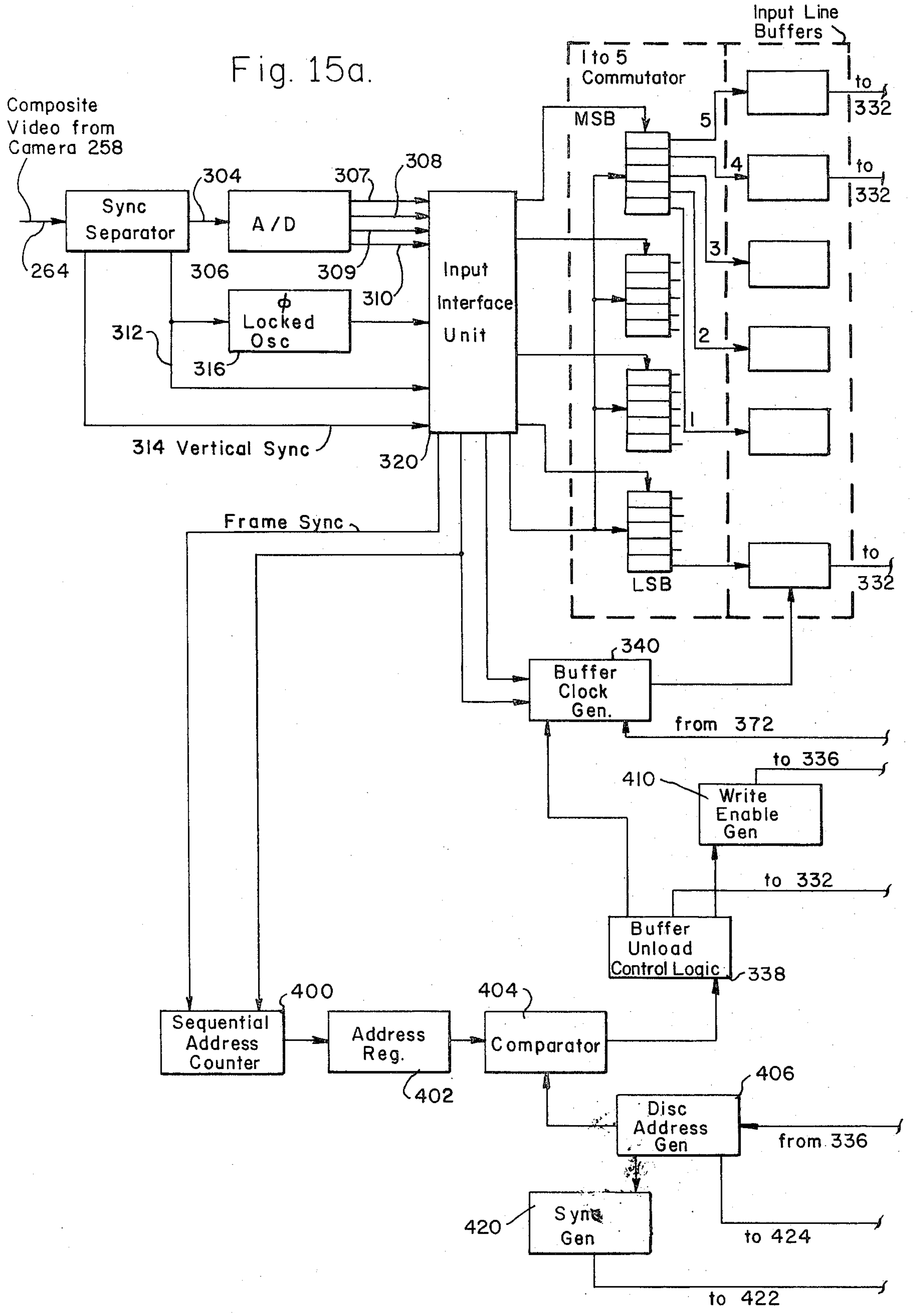
FIGS. 15*a* and 15*b* are a schematic block diagram of a digital scan converter that may be utilized in the system of the invention to provide the video data.
Figure 15B:
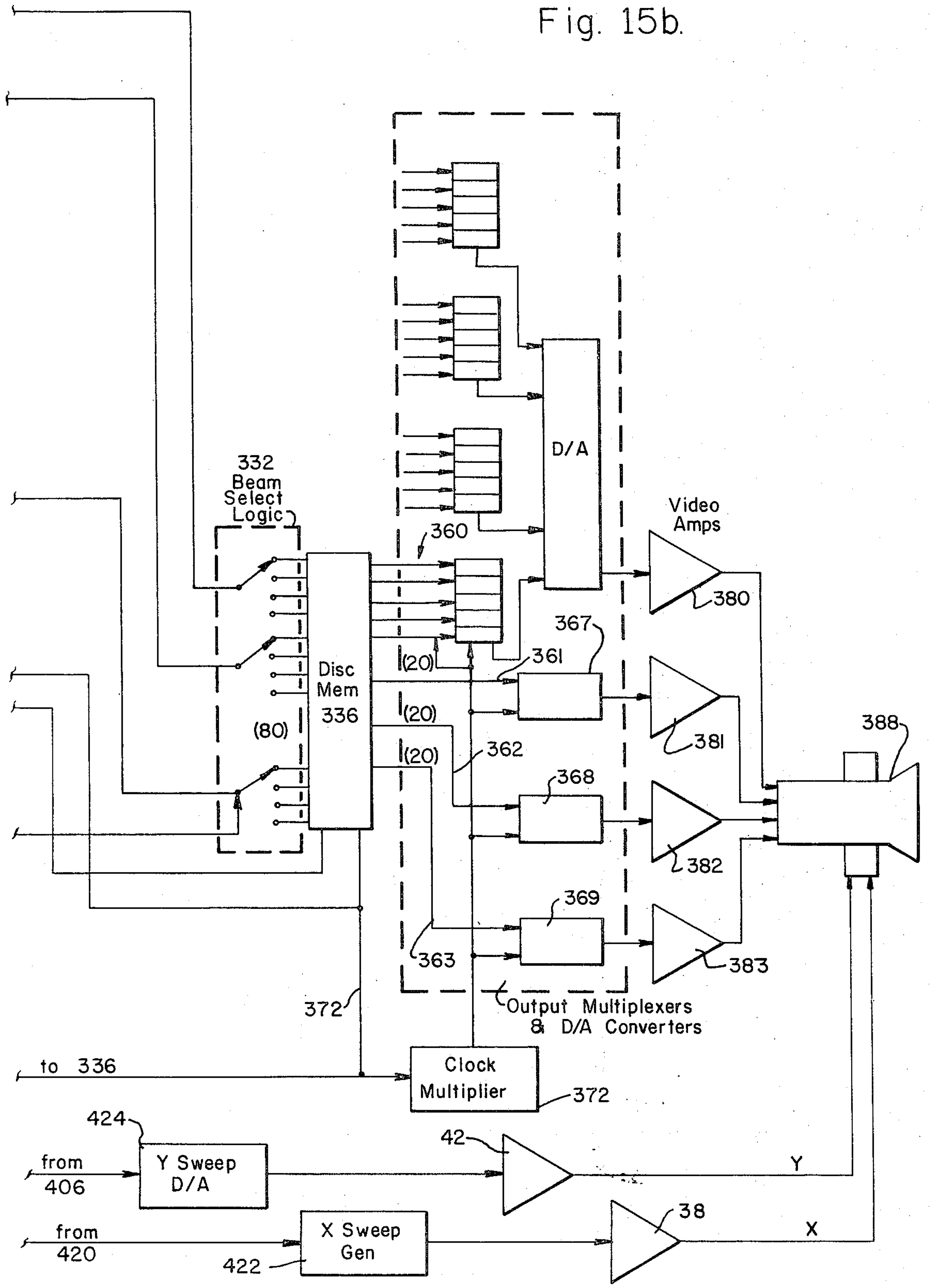
Figure 16:
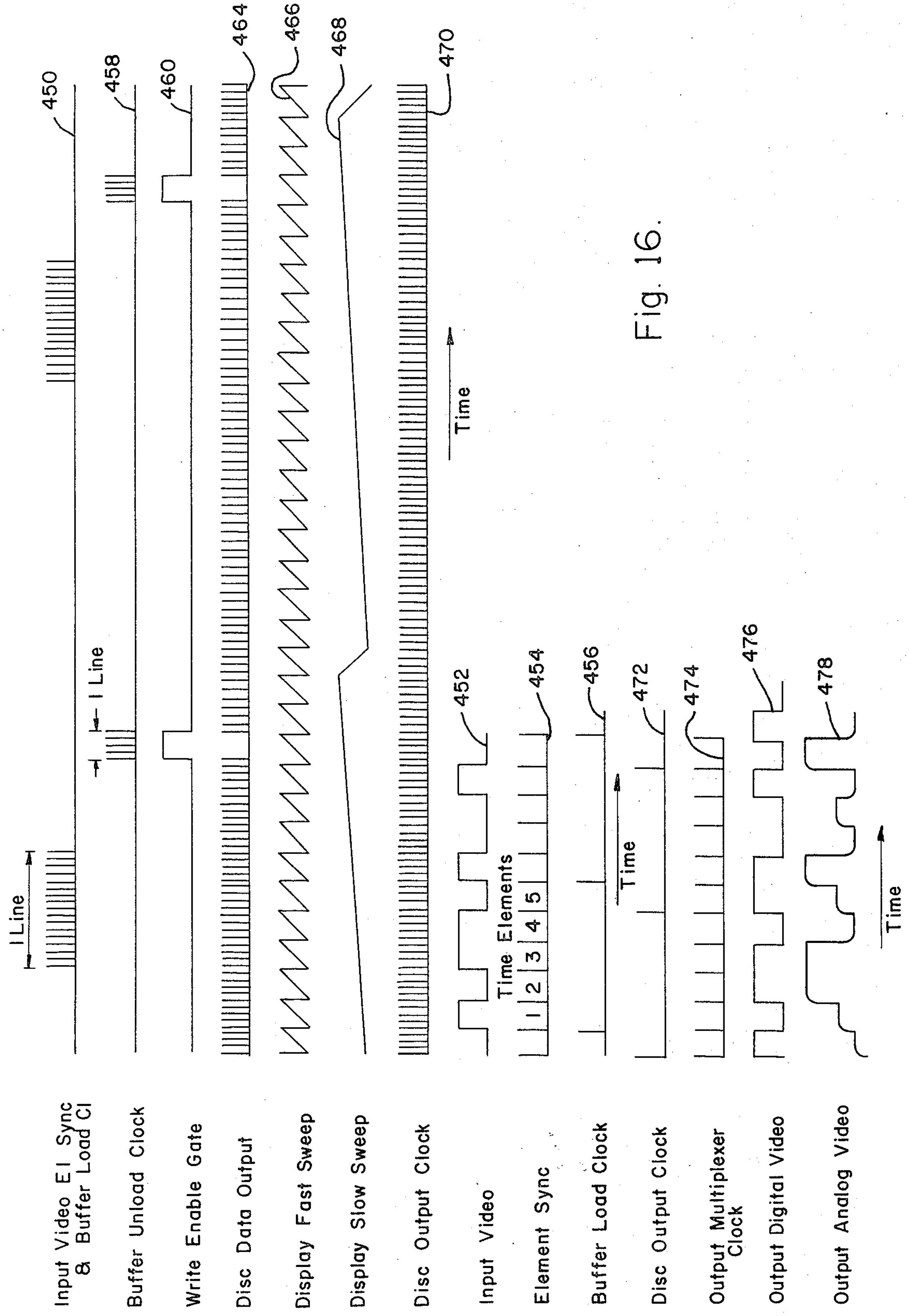
FIG. 16 is a schematic diagram of waveforms of voltage as a function of time for further explaining the operation of the scan converter of FIGS. 15*a* and 15*b*.

Referring now to FIGS. 15*a*, 15*b*, and 16, a more detailed example will be explained with a circuit that converts a standard single channel video output signal into 4 parallel video channel signals representing four adjacent lines of the scene for use in the multibeam display tube system in accordance with the invention. Composite video from the camera 258 (FIG. 14) is received on the lead 264 and is applied to the synchronizing signal separator 302 which may be of a conventional type including clipping circuits and which applies the video signal on a composite lead 304 to an A to D convertor 306 which in turn provides 4 bits of video data on leads 307 to 310. The synchronization signal separator applies a horizontal synchronizing signal to a lead 312 and a vertical synchronizing signal to a lead 314 with the horizontal synchronizing signal applied to a phase-lock oscillator 316 to develop an element synchronizing signal equal to the number of displayed elements per line such as 1,500. The 4 bit video signal which represents a signal display element or a portion such as 1/1,500 of a line and synchronizing signals are applied to an interface electronics unit 320 which provide suitable amplification and impedance matching. The digital video signal is applied from the interface unit 320 on 4 leads to a 1 to 5 commutator 324 which may include 4 registers or shift registers each having 5 flip-flops and each register receiving a different significant bit of the video number. The output of the commutator 324 on 20 leads is applied to an input buffer unit 328 which includes 20 registers with 300 flip-flops per register so that the stored output therefrom on 20 lines is one display raster line. A beam select logic or gate unit gates the video data through 20 of 80 leads to a disc memory 336 in response to a buffer unload control logic unit 338 responding to a comparison of the input address and the disc memory address. All of a line is transferred through the first switch position of the twenty switches of the logic unit 332 followed by a change of switch positions to transfer the next line into the disc. Thus, four lines are stored for parallel readout. The input line buffer unit 328 also receives the buffer clock signal from a clock 340 which in turn responds to a shift or comparison signal from the control logic unit 338. When the buffer clock generator 340 which is a three position switch is enabled by the line sync signal the element sync signal is applied to the shift registers to transfer bits therein and when the clock generator is enabled by an address comparison, the disc clock is applied to the buffers to transfer the bits to the beam select unit 332. In the illustrated arrangement, the beam select logic unit 332 may include 20 continually rotating switches so that the data of four adjacent display lines is positioned at four adjacent tracks of the disc memory 336 with the next four lines being placed in the same four disc tracks (each line may occupy 20 parallel tracks). The disc memory 336 which may include 80 tracks applies the video on four composite leads 360 to 363, each of 20 lines, to respective output multiplexers and D to A converter units 366 to 369 which are responsive to the high speed multiplexer clock 372 receiving disc clock signals from a lead 374 as derived from the disc memory 336. The four shift registers receiving the video signals for one line on the first lead 360 are shown in detail with the four bits of a line being loaded at a first pulse rate in response to 300 clocks and transferred to the D/A converter at a second pulse rate in response to 1,500 pulses, for example. Each of the composite leads 360 to 363 passes a line of data, five elements at a time. In other words, the illustrated arrangement transfers five elements into the disc memory at one time and transfers five elements at a time out of the disc memory. The analog video is than applied from the D/A converter units 366 to 369 through respective video amplifiers 380 to 383 and in turn through suitable leads to the electron gun control electrodes in an illustrated 4 beam cathode ray tube 388. For interlacing with an 8 beam tube, the interlace switches 80 to 83 of FIG. 1 may be utilized.

For providing the proper address for data to be written or recorded into the disc memory 336 a sequential address counter 400 receives frame sync and line sync signals to apply address values to a storage unit 402 which is in turn applied to a comparator unit 404. In response to the disc clock on the lead 374, a disc address generator 406 develops a disc address which is applied to the comparator 404 to develop a write enable pulse when the input video line address compares with the address, which pulse is applied through a lead 408 as a compare pulse to the buffer unload control logic unit 338. The clock generator 340 includes a switch that is enabled to apply a disc clock pulse to the buffers during readout into the disc. Also, the compare pulse is applied to a write enable generator unit 410 to enable the disc memory 336.

The disc address generator unit 406 also applies an address to a synchronizing generator 420 to apply a signal to an X sweeep generator 422. The disc address is further used in a Y sweep D to A unit 424 to convert the address to a Y sweep signal. The X and Y sweep signals are applied through suitable deflection amplifiers 38 and 42 to respective leads 436 and 438 which are coupled to the cathode ray tube deflection yokes as previously explained.

The input single channel video including the element synchronizing signal on the lead 264 is shown by a waveform 450 as bursts of video each representing a single line of video data. A portion of the input video on a different time scale is indicated by a waveform 452, and occurs on the leads at the output of the interface unit 320. The element sync signal on the lead at the output of the phase locked oscillator 316 which shifts data into the commutator 324 which may be considered a relatively slow signal is shown by a waveform 454, and a buffer load clock signal from the clock generator 340 shown by waveform 456 as even a slower rate pulse for shifting the data out of the input line buffers. The buffer unload clock which transfers data to the disc memory is shown by a waveform 458 and provides a signal for each line period. In response to the write enable generator 410 a write enable gate of a waveform 460 enables the writing of the video into the disc memory 336. The disc data output as shown by waveform 464 and which represents the signal on the composite leads 360 to 363 is continuous except during the period of the write enable gate of the waveform 460. Thus, the disc memory is operated at the speed desired for the readout. The display fast sweep is shown by waveform 466 and the display slow sweep signal is illustrated by the waveform 468. The disc output clock which operates is a relatively fast rate is illustrated by waveform 470 and is shown in more detail on a separate time scale as the clock of a waveform 472 which appears on the lead 374 and is utilized for loading the shift registers of the units 366 to 369. The output multiplexer clock for unloading the multiplexer shift registers is shown as a waveform 474 pulsing at a relatively high speed. The output digital video of a waveform 476 is applied to the D to A units to provide an output analog video of a waveform 478 at the input leads of the video amplifiers. As an illustrative example, the element sync signal of the waveform 454 may operate between 50 and 500 Kilohertz depending on the aircraft speed, the output clock of the waveform 472 may operate at 3 MHz and the output multiplexer clock of the waveform 474 may operate at 15 MHz.

Thus, FIGS. 15 and 16 illustrate a multibeam scan convertor for converting a standard single channel video output signal into 4 parallel video channels as required for the display. The purpose for the 1 to 5 commutator is to reduce the video rates to one-fifth their normal values so that the data rates are compatible with the disc storage system. After the 1 to 5 commutation each of the 5 lines are split into 4 separate parallel channels corresponding to the four beams of the CRT for a total of 20 channels per intensity code level. These 20 channels are then recombined back into the basic 4, as required to drive the display. In recombining the channels the video data rate is multiplied by 5. It has been noted that the principles of the invention are not to be limited to any particular serial parallel converter but that any suitable arrangement or source of parallel video data may be utilized.

Thus there has been described a television type display system that utilizes a raster scanned multi-beam cathode ray tube to provide a high brightness and a high resolution picture with a low bandwidth per channel requirement. For a color display, a field sequential type system is utilized while retaining the relatively low bandwidth operation and a high picture resolution. A switching scheme may be provided, also in accordance with the invention, to develop a simplified and reliable interlacing operation.

What is claimed is:

1. A field sequential color television system comprising:

a cathode ray tube having an electron gun having N electrodes for developing N beams and having an information retentive surface for writing a frame of data thereon;

means coupled to said cathode ray tube for controlling the deflection of said plurality of beams to form fields on said information retentive source;

a source of video data for providing separate data for each electrode;

amplifier means with a plurality of individual amplifiers coupled between said source and said control electrodes with one amplifier for each control electrode for providing individual control for each of said plurality of beams;

switching means coupled between said source and said plurality of individual amplifiers so that N/2 alternately positioned electrodes are energized during alternate field periods to develop N/2 beams of said frame for providing interlacing; and a sequentially changing color filter positioned adjacent to said information retentive surface and coupled to said source for being sequenced with said video data.

2. A television display system for providing a line interlace during alternate fields of a frame comprising:

a source of video data including synchronizing means;

a cathode ray tube having a multi-beam electron source in turn having N control electrodes with one for each beam, said tube having a display surface;

means coupled to said synchronizing means and to said tube for controlling the deflection of said electron beams to form said fields;

switching means coupled to said source of video data for receiving N/2 sequences of data and coupled to said synchronizing means;

N amplifier means with one coupled to each of said control electrodes and each coupled to said switching means so as to apply said N/2 sequences of video data to alternate N/2 control electrodes during alternate fields; and means for producing a field sequential television signal display positioned adjacent to said display surface and coupled to said synchronizing means.

3. The combination of claim 2 in which said means for producing a field sequential television signal display is an electromechanical filter.

4. A low bandwidth television display system comprising:

display means for providing a display at a predetermined position and including a cathode ray tube having sweep control means and a multiple beam electron gun having N control electrodes with a control electrode for each beam;

a source of video data for providing parallel sequences of data for each of said electrodes;

N amplifier means coupled to said source for each receiving a different sequence of data and each coupled to a different control electrode;

sweep generator means coupled to said sweep control means;

synchronizing means coupled to said source of video data and to said sweep generator means; and switching means coupled between said source of video data and said N amplifier means for sequentially applying N/2 sequences of video data to alternate N/2 control electrodes through the corresponding amplifier means.

* * * * *